United States Patent [19]
Collins et al.

[11] Patent Number: 5,730,776
[45] Date of Patent: Mar. 24, 1998

[54] HYDROMETALLURGICAL PROCESS FOR THE EXTRACTION OF COPPER FROM SULPHIDIC CONCENTRATES

[75] Inventors: Michael J. Collins; Donald K. Kofluk, both of Fort Saskatchewan, Canada

[73] Assignee: 698638 Alberta Ltd., Fort Sasakatchewan, Canada

[21] Appl. No.: 607,754

[22] Filed: Feb. 27, 1996

[30] Foreign Application Priority Data

Feb. 27, 1995 [GB] United Kingdom ............ 9503877

[51] Int. Cl.$^6$ .................... C22B 15/00; C22B 3/08
[52] U.S. Cl. .................. 75/728; 75/731; 75/743; 423/27; 423/41
[58] Field of Search ............. 75/429, 718, 728, 75/731, 743; 423/27, 41

[56] References Cited

U.S. PATENT DOCUMENTS

| | | | |
|---|---|---|---|
| 3,867,268 | 2/1975 | Kawulka et al. | 204/119 |
| 4,004,991 | 1/1977 | Veltman et al. | 204/119 |
| 4,343,773 | 8/1982 | Miller et al. | 423/1 |
| 4,483,827 | 11/1984 | Heimala | 423/28 |
| 5,232,491 | 8/1993 | Corrans et al. | 75/743 |

FOREIGN PATENT DOCUMENTS

| | | | |
|---|---|---|---|
| 53-058403 | 5/1978 | Japan | B02D 1/02 |

OTHER PUBLICATIONS

Extractive Metallugy of Copper, Third Edition, A.K. Biswas and W.G. Davenport, Chapter 18, pp. 359–382.

Hydrometallurgical Production of Copper From Flotation Concentrates, J.R. Cobble, C.E. Jordan, and D.A. Rice, Report of Investigations/1993, United States Department of the Interior, Bureau of Mines, pp. 1–14 (no month).

Autoclaving of Copper Concentrates, James A. King and David B. Dreisinger, Proceedings of Copper 95–Cobre 95 International Conference, vol. III—Electrorefining and Hydrometallurgy of Copper, Edited by W.C. Cooper, D.B. Dreisinger, J.E. Dutrizac, H. Hein and G. Ugarte, The Metallurgical Society of CIM, pp. 511–533, 1995 (no month).

Effect of Sulfur–Dispersing Surfactants on the Oxygen Pressure Leaching of Chalcopyrite, Ralph P. Hackl, David B. Dreisinger and Jim A. King, Proceedings of Copper 95—Cobre 95 International Conference, vol. III—Ugarte, The Metallurgical Society of CIM, pp. 559–577, 1995 (no month).

Effect of Surfactants on Zinc and Iron Dissolution Rates During Oxidative Leaching of Sphalerite, George Owusu, David B. Dreisinger, and Ernest Peters, Hydrometallurgy 38 (1995), pp. 315–325 (no month).

Hydrometallurgical Processing of Copper Concentrates, C.J. Ferron and C.A. Fleming, Proceedings of Copper 95–Cobre 95 International Conference, vol. III—Electrorefining and Hydrometallurgy of Copper, Edited by W.C. Cooper, D.B. Dreisinger, J.E. Dutrizac, H. Hein and G. Ugarte, The Metallurgical Society of CIM, pp. 535–548, 1995 (no month).

Copper Metallurgy at the Crossroads, Fathi Habashi, Proceedings of Copper 95–Cobre 95 International Conference, vol. III—Electrorefining and Hydrometallurgy of Copper, Edited by W.C. Cooper, D.B. Dreisinger, J.E. Dutrizac, H. Hein and G. Ugarte, The Metallurgical Society of CIM, pp. 493–510, 1995 (no month).

Coal, Van Nostrands Scientific Encyclopedia, 7th Edition, Considine, vol. 1, pp. 662–665 (no date).

*Primary Examiner*—David A. Simmons
*Assistant Examiner*—J. A. Lorengo
*Attorney, Agent, or Firm*—Arne I. Fors

[57] ABSTRACT

There is provided a novel hydrometallurgical process for the extraction of copper from sulphidic concentrates involving an oxidizing pressure leach using dilute sulphuric acid and a carbonaceous additive. The leaching step is carried out preferably at temperatures above the melting point of sulphur but below about 200° C.

45 Claims, 1 Drawing Sheet

HYDROMETALLURGICAL PROCESS FOR THE EXTRACTION OF COPPER FROM SULPHIDIC CONCENTRATES

FIELD OF THE INVENTION

The present invention relates to a novel hydrometallurgical process for the extraction of copper from copper containing sulphide concentrates, particularly refractory sulphides such as chalcopyrite.

BACKGROUND OF THE INVENTION

Chalcopyrite, a sulphidic copper mineral, is economically the most important source of copper. Up to the present time smelting technology remains the only commercially successful route for the recovery of copper from chalcopyrite. Modern smelting processes exploit the energy content of sulphur concentrates recovering most of the sulphur content therein as sulphuric acid, with the balance being emitted to the environment as a weak stream of sulphur dioxide. Deleteriously, the sulphur dioxide emissions are environmentally unacceptable and there exists, at best, only a limited market for sulphuric acid in most locations. Since smelting remains relatively expensive, alternative, more economical and less ecologically damaging processes for treating chalcopyrite are continuously sought.

In recent years, hydrometallurgical processes, specific to the recovery of copper from oxide ores, have come into commercial operation. Such processes are based on the sulphuric acid leaching of the oxide ore, copper separation from the impure leach liquor by solvent extraction and recovery of metallic copper from the strip liquor by electrowinning. This technology not only produces copper at significantly less cost than most smelting processes, but the electrowon copper is fully competitive in quality with electrorefined copper produced by smelting and refining. To date, however, no viable hydrometallurgical process for the treatment of chalcopyrite has been developed despite extensive and intensive research efforts.

Theoretically, the economically preferred hydrometallurgical process for treating chalcopyrite concentrates would involve a sulphuric acid leach which is operative to produce directly a high strength copper sulphate solution having low acid and iron concentrations and be free of impurities such as selenium, tellurium, arsenic and antimony. Ideally, the process would also convert the sulphide content to elemental sulphur. By-product metal values such as silver and gold should also be recoverable at low cost from the leach residue.

Unfortunately, the direct leaching of chalcopyrite in sulphuric acid solutions presents a variety of problems. Generally, at temperatures below the melting point of sulphur (approximately 118° C.), the rate of copper dissolution is uneconomically slow. At temperatures above the melting point of sulphur, a passivation action, believed to be caused by the occlusion of unreacted sulphide particles by a coating of elemental sulphur, takes place, again rendering extraction of copper uneconomic. At still higher temperatures, namely above 200° C., leaching of copper occurs rapidly and completely, but the sulphides are oxidized to sulphate, rather than to elemental sulphur. This reaction consumes economically prohibitive amounts of oxygen whilst generating high concentrations of sulphuric acid which are costly to neutralize.

Such high temperature direct oxidation leach processes have been evaluated as alternatives to smelting for specific applications. As an example, in an article entitled "Autoclaving of Copper Concentrates" by J. A. King et al. (Proceedings of Copper 95-Cobre 95 International Conference Volume III—Electrorefining and Hydrometallurgy of Copper, Edited by W. C. Cooper et al, The Metallurgical Society of CIM) there is described a hydrometallurgical process for the total pressure oxidation of copper concentrate. The process involves autoclaving the concentrates at temperatures of 200°–220° C. under oxygen pressure after which the autoclave discharge is separated into a solid residue and leach solution. The oxidation solution is neutralized with limestone and is then treated by solvent extraction/electrowinning to recover copper therefrom. This process is not considered to be economically competitive with smelting due to the high consumption of oxygen and limestone.

Several other leaching systems such as ferric chloride or ammoniacal ammonium sulphate leach solutions for copper extraction from chalcopyrite have been extensively studied over the last thirty years with numerous processes being proposed.

However, in the case of ammoniacal leaching of chalcopyrite, the sulphide sulphur associated therewith is oxidized to sulphate which, deleteriously, must be subsequently removed from solution either as ammonium sulphate or gypsum in order to maintain the sulphate balance thereof.

Whilst ammoniacal solution leaching processes for extraction of copper have been operated commercially for secondary or enriched sulphides such as chalcocite and covellite, (which leave chalcopyrite and bornite in the leach residue), to date no such commercial processes are in operation for the complete extraction of copper from chalcopyrite.

In U.S. Pat. No. 4,039,406 to Stanley R. W. et al., a novel way of overcoming the difficulties of directly pressure leaching chalcopyrite is disclosed. The process combines the rapid chalcopyrite reaction kinetics obtainable using a chloride media with the recovery of copper from a sulphate media in using a cupric sulphate—cupric chloride solution at 135°–145° C. and 200 psi oxygen overpressure. As with other leaching processes developed to the laboratory or pilot scale level, it is difficult to find commercial acceptance of processes which use a chloride medium due to the inherent toxicity and corrosivity thereof.

An overview of the state of the art of the copper industry which in addition provides an insight of the extent of the work that has gone into the development of hydrometallurgical processes, too extensive to be listed herein, is provided in the text entitled "Extractive Metallurgy of Copper" third edition A. K. Biswas and W. G. Davenport; Pergamon.

Returning in somewhat more detail to the relatively low temperature leaching, namely between about 25° and 150° C., of chalcopyrite in sulphuric acid or ferric sulphate solution, in an oxidizing atmosphere, the reactions taking place are as follows:

$$CuFeS_2 + O_2 + 2H_2SO_4 \rightarrow CuSO_4 + FeSO_4 + 2S° + 2H_2O$$

$$CuFeS_2 + 2Fe_2(SO_4)_3 \rightarrow CuSO_4 + 5FeSO_4 + 2S°$$

Advantageously, therefore, sulphides are oxidized to the elemental form, rather than to the sulphate, thereby substantially decreasing not only oxygen requirements, but also subsequent neutralization requirements. This advantage is offset by not only a slower extraction but also by a limited extraction of between 50–75%. It has been found that the upper reaction temperature favouring the formation of elemental sulphur is about 150° C.

It is generally believed that a passivating layer develops on the chalcopyrite particles during oxidative leaching at relatively low temperatures (i.e. less than about 200° C.) in sulphate media, which inhibits and/or completely prevents copper extraction within a commercially viable time. Hypothetically, the passivating layer may comprise elemental sulphur or an intermediate sulphur-rich phase formed by the partial oxidation of chalcopyrite.

Attempts have been made to parallel the mechanism of zinc extraction processes with those of the reactions of chalcopyrite in oxidative low temperature sulphuric acid leaches.

It is well known that zinc can be recovered from zinc bearing sulphidic concentrates by reacting the sulphides with sulphuric acid in the presence of oxygen at elevated temperatures and pressures. At temperatures above the melting point of sulphur, the elemental sulphur which is formed in the leaching reactions is present as finely divided liquid sulphur globules. As the reaction proceeds, the quantity of these globules increases and they coat or occlude unreacted sulphide particles, rendering them inert to further oxidation. Additives can be added to the process which prevent, or at least substantially inhibit, molten sulphur from coating the unleached sulphide particles, thereby allowing the reactions to proceed until high extractions of zinc, typically in excess of 95% and preferably in excess of 98%, are achieved, as taught for example, in U.S. Pat. Nos. 3,867,268 and 4,004,991. Further, the additives assist in the formation of a finely divided leach residue, with good physical handling characteristics. Without the additives, zinc extraction is typically only about 50–70%, and the liquid elemental sulphur may agglomerate, leading to the production of coarse, difficult to handle particles, which plug pipelines and vessels.

The additives used in this process must be compatible with the oxidation of zinc sulphide, and must not introduce impurities into the zinc bearing process streams. A number of surface active agents have been used for this purpose, including organic compounds such as lignin derivatives, particularly calcium and sodium lignosulphonates; tannin compounds, particularly tree bark and heartwood extracts such as quebracho, hemlock and redwood extracts; orthophenylene diamine; and alkaryl sulphonates, particularly sodium alkylbenzene sulphonates. Calcium lignosulphonate and quebracho have been applied in commercial practice. The current state of the art relating to the use of soluble surface active agents in zinc pressure leaching is summarized in a recent paper entitled "Effect of Surfactants on Zinc and iron Dissolution during Oxidative Leaching of Sphalerite" by G. Owusu et al., Hydrometallurgy 38 (1995) 315–324.

However, a paper by R. P. Hackl et al. entitled "Effect of sulfur-dispersing surfactants on the oxygen pressure leaching of chalcopyrite (Proceedings of Copper 95-Cobre 95 international Conference Volume III - Electrorefining and Hydrometallurgy of Copper, Edited by W. C. Cooper et al, The Metallurgical Society of CIM) clearly demonstrates that the use of the sulphur-dispersing surfactants employed in zinc processes cannot be straightforwardly extrapolated to the pressure leaching of copper sulphidic concentrates, specifically chalcopyrite. The authors investigated the feasibility of using molten sulphur-dispersing surfactants to enhance the oxygen pressure leaching of chalcopyrite at temperatures ranging between 125°–155° C. Most of the surfactants tested decomposed too rapidly to be beneficial although addition of 50 kg/t of orthophenylenediamine (OPD) resulted in 80% copper extraction after 6 hours.

It is to be noted, furthermore, that it is widely accepted that copper exhibits a catalytic effect on the decomposition of the above-mentioned sulphur-dispersing surfactants.

Thus at the present time, despite the extensive research conducted into the production of commercially viable hydrometallurgical processes for the extraction of copper from chalcopyrite, pyrometallurgical processes remain the state of the art.

SUMMARY OF THE INVENTION

It is the primary objective of the present invention to provide a commercially viable hydrometallurgical process for the extraction of copper from copper sulphidic concentrates, in particular iron-bearing copper sulphidic concentrates and more specifically chalcopyrite.

In accordance with the process of the invention for the extraction of copper from sulphidic copper concentrates, the finely divided concentrate is initially dispersed, in a finely divided form, in an aqueous sulphuric acid to thereby form a slurry. The sulphuric acid concentration is adjusted so as to be functional to provide the desired, experimentally determined copper, iron and acid concentrations in the final leach solution. An effective amount of finely divided particulate carbonaceous material is provided and, preferably, combined with the slurry. The carbonaceous material should be compatible with the acid sulphate leach solution, and operative under the reaction conditions of the oxidizing leach step, to inhibit what is believed to be a passivating action occurring on the incompletely leached sulphide particles. The slurry and carbonaceous material are reacted, with agitation, with free oxygen bearing gas in an autoclave at a temperature, preferably in the range of between 135°–175° C., to thereby produce substantially complete extraction of copper values from said concentrate as soluble copper sulphate. Concurrent conversion of the major fraction of sulphide sulphur to elemental form occurs. The product leach solution containing the dissolved copper values is separated from the solid residue.

The process of the invention lends itself particularly to the treatment of the refractory mineral, chalcopyrite, which has, heretofore, been commercially processed utilizing smelting technology.

Advantageously, in practising the process for the extraction of copper from chalcopyrite, high extraction of copper, of the order of above 95%, is obtained. Concomitantly, by conducting the pressure leach at relatively low temperatures, with a particular class of additives, it is possible to control the reaction whereby the sulphide sulphur is converted to its elemental form, thus reducing neutralization and purification requirements during subsequent processing. Significantly, too, the use of low reaction temperature and inexpensive additives contributes to predisposition of the process to commercial application.

Thus, the process of the invention is founded upon the provision of a novel class of additives, namely carbonaceous materials, preferably coals, which are functional to overcome the passivation of incompletely leached sulphide particles that takes place at reaction temperatures and conditions favouring the formation of elemental sulphur.

DESCRIPTION OF THE DRAWING

The present invention will be better understood with reference to the detailed description below and the following figure.

DESCRIPTION OF THE PREFERRED EMBODIMENT

Figure 1:
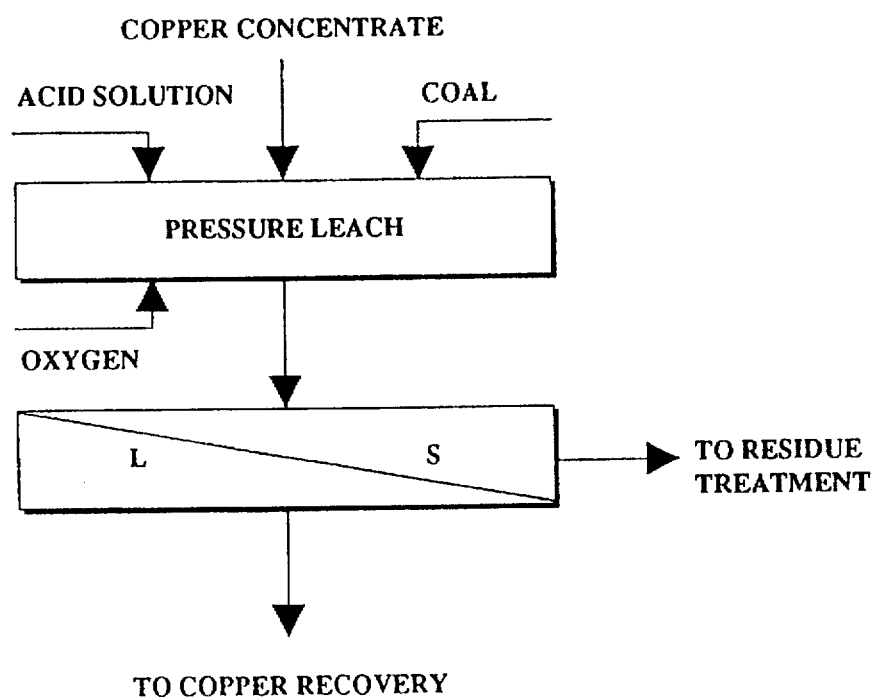
FIG. 1 is a generalized flowsheet for the extraction of copper from a sulphidic copper concentrate having a single pressure leach step.

The invention is described broadly, having reference to the accompanying figure, in terms of a single stage leach.

However, it will be readily evident to one skilled in the art, that the process of the instant invention may be extended to a multiple stage leach, and both cocurrent and countercurrent stage leaches.

The process is applicable to sulphidic copper concentrates, the most important of which would be those of chalcopyrite ($CuFeS_2$); chalcocite ($Cu_2S$); bornite ($Cu_5FeS_4$); and covellite ($CuS$) and the less abundant enargite ($Cu_3AsS4$) or tetrahedrite ($Cu_{12}Sb_4S_{13}$). The process finds particular application in the treatment of both high and low grade concentrates obtained by the selective froth flotation of chalcopyrite ores. In addition to copper, iron and sulphide, such concentrates will often contain a small but economically significant quantity of silver, gold and other precious metals. In order to obtain optimum results, the sulphidic starting material preferably should be in a finely divided particulate form. The particle size has a pronounced effect on the rate of reaction and the degree of copper extraction as well as the retention time in the pressure leaching stage. It is preferable, in order to realize the full benefits of the invention, that the starting material be about 90% minus 10 microns but may range from 90% minus 44 microns to 90% minus 25 microns or less. The feed material may, therefore, require some further size reduction such as by wet grinding in a ball mill or other appropriate device to thereby obtain the desired particle size.

Optionally, the reground concentrate may be leached in dilute sulphuric acid under low temperature atmospheric pressure conditions, to remove easily soluble impurities such as magnesium, manganese, chloride and fluoride, followed by liquid/solid separation.

The process of the invention includes the provision of an additive which is compatible with the aqueous acid sulphate solution and which is functional, under the reaction conditions of the pressure leach process, to inhibit what is believed to be the passivation of incompletely leached sulphide particles. The additive would comprise any suitable carbonaceous material, but most preferably would be a coal. Preferably the additive would be a lower carbon content coal which would not introduce undesirable impurities which remain in the leach liquor to interfere with subsequent processing. Such coals may include cannel coal, peat, lignite, subbituminous, bituminous, semi-bituminous, semi-anthracite and anthracite coal. The preferred coals are lower ranking, or intermediate carbon level, coals rather than high ranking, or high carbon level, coals. Preferably, the total carbon content of the coal would range between 40 to 85%. Generally, high carbon content coals, of primarily aromatic carbon character, exemplary of which are anthracite coals, have been found to be less effective than coals having a lower carbon content with a significant aliphatic carbon component in the range of about 20 to 80%, preferably an aliphatic carbon content in the range of about 25 to 55%. The coals should be finely divided having particle sizes ranging up to about 60 microns. Alternatively, the coal and concentrate may be ground together. If coal dust is available it may prove suitable for use without the expediency of grinding being found necessary. As a general rule, it is desirable to add the minimum amount of coal that is effective to maximize copper extraction in any given case. In most cases, the addition of from about 3 to 50 kg of coal per tonne of copper concentrate, typically about 10 kg/tonne will be sufficient. It is evident to one skilled in the art that the amount of coal required will be correlative to the nature thereof, i.e. its ranking and particle size, and furthermore to take into account any carbon contained in the copper bearing concentrate. It has been observed, that under the experimental conditions described herein, that less than about 50 percent chemical breakdown of the coal takes place.

By way of background, ASTM standards use fixed carbon and calorific values calculated on a mineral-matter-free basis as the classifying criteria, classification by rank being in accordance to the degree of metamorphism, or progressive alteration, in the natural series from lignite to anthracite. European classifications include (a) The International Classification of Hard Coals by Type and (b) The International Classification of Brown Coals, as taught in "Van Nostrand's Scientific Encyclopedia", 7th Edition, Considine, Volume 1, pp 662–663. Generically, coal may be defined as a combustible, carbonaceous sedimentary rock formed by the compaction of partially decomposed plant materials.

The leaching reaction is carried out in agitation-equipped pressure vessels, such as autoclaves, at a temperature above the melting point of sulphur, i.e., above about 120° C., but below about 220° C., preferably between about 135° and 175° C. and most preferably at about 150° C. However, it is contemplated that the reaction may be conducted at temperatures as low as 90° C.

The total pressure at which the leaching reactions are conducted is the steam pressure autogenously generated at the temperature of the oxidation reaction plus the overpressure of oxidizing gas. Preferably, the oxidizing gas is oxygen but air or oxygen enriched air may also be used. The reaction proceeds satisfactorily with an oxygen overpressure above about 100 kPa. However, there is an improvement in reaction rate as the oxygen overpressure is increased. Thus, it is preferred to use an overpressure of oxygen between about 400 to 750 kPa. The upper limit of oxygen pressure will be that imposed by the autoclave employed. As it is generally desirable, for economic reasons, to avoid the use of high pressure autoclaves, generally the upper limit will be about 3000 kPa oxygen overpressure or air overpressure.

The pulp density of the leach slurry fed to the leach, i.e. the relative quantities of sulphides and solution provided in the leaching step in any given case, is determined having regard to the copper content of the sulphides and the desired copper, iron and acid concentration of the final leach solution in general.

The amount of sulphuric acid provided in the slurry make-up step is determined by the target copper, iron and acid concentration desired in the final leach solution. The amount of acid to be added is determined experimentally by first measuring the yield of elemental sulphur and amount of insoluble sulphide (i.e. the most refractory, typically pyrite). The remaining sulphur content of the feed solids is oxidized to sulphate, namely copper sulphate, ferric sulphate and some ferrous sulphate. Thus a stoichiometric quantity required to effect this conversion is added together with sufficient acid remaining in the final leach solution. A major portion of the iron is precipitated as the basic ferric sulphate and as hydrated iron oxide.

Water, ferrous sulphate, ferric sulphate or an admixture thereof, may be used in place of sulphuric acid as a source of in-situ generated sulphuric acid. Again, the required quantities would be analytically determined whereby the targetted copper, iron and free acid concentration would remain in the final leach solution.

Following the leach, the product leach solution containing the dissolved copper values is separated from the solid residue. Copper may be recovered from the solution by electrowinning, following neutralization of the acid and removal of the iron and optionally purification by solvent extraction.

Embodiments of the invention for extracting copper from chalcopyrite are provided in the following non-limitative examples.

EXAMPLE 1

This example demonstrates the effect of additives upon the extraction of copper from a single concentrate. A commercially available copper sulphide concentrate containing 28% Cu, 29% Fe and 32% S, with the copper present essentially all as chalcopyrite and any iron not found as chalcopyrite present primarily as pyrite was leached in acidic copper sulphate solution containing 30 g/L Cu and 120 to 150 g/L $H_2SO_4$ in a 4 liter laboratory autoclave at 150° C. and 750 kPa oxygen partial pressure for six hours. In the first test no sulphur dispersants were added. In the second test, calcium lignosulphonate was added to the autoclave charge in an amount of 2 kg per tonne of concentrate. In the third test, sub-bituminous coal identified as "Coal A" having a total carbon content of 59% with a particle size of 100% minus 63 microns was added to the autoclave charge in an amount of 25 kg per tonne of concentrate. The results for the three tests are summarized in Table I herebelow. Copper extraction was 49% without additives, 71% with calcium lignosulphonate, and 98% with coal. In the test with addition of coal, 69.4% of the sulphide sulphur in the feed was converted to elemental sulphur, 27.4% was converted to sulphate and 3.2% was unreacted.

TABLE I

| Test | 1 | 2 | 3 |
|---|---|---|---|
| Copper Concentrate | | A | |
| Concentrate Analysis, % | | | |
| Cu | | 27.8 | |
| Fe | | 28.8 | |
| Ni | | <0.1 | |
| Si | | 2.41 | |
| S | | 32.5 | |
| Zn | | <0.1 | |
| Concentrate $D_{90}$, μm | | 13 | |
| Acid: Cu + Fe Mole Ratio | 1.66 | 1.66 | 0.67 |
| Temperature, °C. | | 150 | |
| Oxygen Pressure, kPa | | 750 | |
| Additive | none | Lignosol | Coal A |
| Additive Rate, kg/t | 0 | 2 | 25 |
| Copper Extraction, % | | | |
| 30 min | 46.4 | 55.8 | 50.4 |
| 60 min | 46.8 | 62.5 | 64.7 |
| 120 min | 40.0 | 67.2 | 83.3 |
| 240 min | 42.8 | 71.8 | 96.7 |
| 360 min | 49.3 | 70.8 | 98.4 |
| Final Extraction, % | | | |
| Cu | 49.3 | 70.8 | 98.4 |
| Fe | 59.3 | 70.6 | 26.8 |
| S | | | 16.3 |
| Final Solution, g/L | | | |
| Cu | 46.0 | 50.8 | 79.0 |
| Fe | 20.3 | 23.8 | 19.1 |
| $H_2SO_4$ | 94.0 | 83.5 | 23.6 |
| Final S Conversion, % | | | |
| to S, elemental | | | 69.4 |
| to S, sulphate | | | 27.4 |
| unreacted | | | 3.2 |

EXAMPLE 2

The effect of the particle size of the concentrate on copper extraction rate is illustrated in Table II below. Greater than 95% copper extraction was obtained after two hours in Test 3, when 90% of the feed passed a 7 micron screen.

TABLE II

| Test | 1 | 2 | 3 |
|---|---|---|---|
| Copper Concentrate | | B | |
| Concentrate Analysis, % | | | |
| Cu | | 23.4 | |
| Fe | | 29.0 | |
| Ni | | 0.2 | |
| Si | | 1.09 | |
| S | | 34.1 | |
| Zn | | 5.9 | |
| Concentrate $D_{90}$, μm | 28 | 16 | 7 |
| Acid: Cu + Fe Mole Ratio | 0.70 | 0.69 | 0.69 |
| Temperature, °C. | | 150 | |
| Oxygen Pressure, kPa | | 750 | |
| Coal Type | | A | |
| Coal Addition Rate, kg/t | | 25 | |
| Copper Extraction, % | | | |
| 30 min | 20.0 | 44.6 | 62.6 |
| 60 min | 36.1 | 64.9 | 83.4 |
| 120 min | 63.3 | 83.1 | 95.2 |
| 240 min | 82.9 | 94.7 | 98.2 |
| 360 min | 90.6 | 97.9 | |
| Final Extraction, % | | | |
| Cu | 90.6 | 97.9 | 98.2 |
| Fe | 8.6 | 12.4 | 38.3 |
| S | −4.5 | 0.6 | 15.4 |
| Final Solution, g/L | | | |
| Cu | 75.6 | 77.9 | 76.2 |
| Fe | 13.1 | 13.2 | 27.1 |
| $H_2SO_4$ | 11.7 | 14.6 | 20.4 |
| Final S Conversion, % | | | |
| to S, elemental | | 70.3 | 65.3 |
| to S, sulphate | | 27.2 | 33.1 |
| unreacted | | 2.5 | 1.6 |

EXAMPLE 3

The effect of the additive quantity of Coal A is depicted in Table III below. 98% copper extraction was obtained for coal additions of 5 kg/t concentrate or greater.

TABLE III

| Test | 1 | 2 | 3 | 4 |
|---|---|---|---|---|
| Copper Concentrate | | B | | |
| Concentrate Analysis, % | | | | |
| Cu | | 23.4 | | |
| Fe | | 29.0 | | |
| Ni | | 0.2 | | |
| Si | | 1.09 | | |
| S | | 34.1 | | |
| Zn | | 5.9 | | |
| Concentrate $D_{90}$, μm | | 7 | | |
| Acid: Cu + Fe Mole Ratio | 0.69 | | | 0.86 |
| Temperature, °C. | | 150 | | |
| Oxygen Pressure, kPa | | 750 | | |
| Coal Type | | A | | |
| Coal Addition Rate, kg/t | 2 | 5 | 10 | 30 |
| Copper Extraction, % | | | | |
| 30 min | | 50.4 | 62.5 | 68.9 |
| 60 min | 78.3 | 75.8 | 79.9 | 84.5 |
| 120 min | 87.5 | 93.2 | 94.3 | 94.3 |
| 240 min | 89.0 | 98.4 | 98.7 | 97.5 |
| 360 min | | | | |

TABLE III-continued

| Test | 1 | 2 | 3 | 4 |
|---|---|---|---|---|
| Final Extraction, % | | | | |
| Cu | 89.0 | 98.4 | 98.7 | 97.5 |
| Fe | 46.7 | 29.8 | 68.3 | 59.8 |
| S | 31.7 | 8.8 | 25.0 | 25.0 |
| Final Solution, g/L | | | | |
| Cu | 67.0 | 73.9 | 69.1 | 63.6 |
| Fe | 27.1 | 23.9 | 33.4 | 27.8 |
| $H_2SO_4$ | 20.9 | 19.7 | 20.5 | 21.4 |
| Final S Conversion, % | | | | |
| to S, elemental | 49.1 | 69.6 | 68.1 | 63.1 |
| to S, sulphate | 43.5 | 28.5 | 31.9 | 35.9 |
| unreacted | 7.4 | 1.9 | — | 1.0 |

EXAMPLE 4

This example provides data on the effect of the coal additive type on the extraction of copper. The coals were of the sub-bituminous and bituminous classes with the following total carbon content:

| Coal Type | Total Carbon Content |
|---|---|
| A | 59% |
| B | 68% |
| C | 70% |
| D | 56% |
| E | 84% |
| F | 84% |

The results are provided in Table IV. Greater than 96% copper extraction was obtained for additions of coal with one third or more of the carbon of aliphatic nature.

TABLE IV

| Test | 1 | 2 | 3 | 4 | 5 | 6 |
|---|---|---|---|---|---|---|
| Copper Concentrate | | | B | | | |
| Concentrate Analysis, % | | | | | | |
| Cu | | | 23.4 | | | |
| Fe | | | 29.0 | | | |
| Ni | | | 0.2 | | | |
| Si | | | 1.09 | | | |
| S | | | 34.1 | | | |
| Zn | | | 5.9 | | | |
| Concentrate $D_{90}$, μm | 7 | 16 | 7 | 7 | 16 | 16 |
| Acid:Cu + Fe Mole Ratio | 0.69 | 0.69 | 0.86 | 0.86 | 0.69 | 0.69 |
| Temperature, °C | | | 150 | | | |
| Oxygen Pressure, kPa | | | 750 | | | |
| Coal Type | A | B | C | D | E | F |
| Coal Carbon Distribution | | | | | | |
| Aliphatic, % | 50.4 | 44.8 | 43.2 | 37.2 | 23.0 | 16.6 |
| Aromatic, % | 49.6 | 55.2 | 56.8 | 62.8 | 77.0 | 83.4 |
| Coal Addition Rate, kg/t | | | 25 | | | |
| Copper Extraction, % | | | | | | |
| 30 min | 62.6 | 41.9 | 67.3 | 68.4 | 30.1 | 28.7 |
| 60 min | 83.4 | 57.1 | 84.4 | 83.9 | 40.5 | 36.3 |
| 120 min | 95.2 | 79.3 | 96.1 | 94.9 | 45.4 | 52.7 |
| 240 min | 98.2 | 93.4 | 98.5 | 98.9 | 51.4 | 54.5 |
| 360 min | | 96.6 | | | 54.1 | 57.2 |
| Final Extraction, % | | | | | | |
| Cu | 98.2 | 96.6 | 98.5 | 98.9 | 54.1 | 57.2 |
| Fe | 38.3 | 4.7 | 76.8 | 79.4 | 49.0 | 55.5 |
| S | 15.4 | −3.8 | 26.7 | | | |
| Final Solution, g/L | | | | | | |
| Cu | 76.2 | 76.0 | 67.7 | 67.9 | 57.2 | 58.7 |
| Fe | 27.1 | 13.2 | 37.2 | 36.8 | 29.4 | 33.3 |
| $H_2SO_4$ | 20.4 | 15.3 | 22.2 | 19.0 | 33.1 | 31.2 |

EXAMPLE 5

The extraction rates of copper and other metals from various concentrate types using coal as the additive were studied and the results are given in Table V below. 98% copper extraction was obtained in all cases, and greater than 60% of the sulphide sulphur in the feed was converted to elemental sulphur.

It is evident from the above examples, that the process is operative for not only the separate copper concentrate, but extends to the treatment of bulk concentrate, with chalcopyrite in admixture with other minerals.

TABLE V

| Test | 1* | 2** | 3 | 4 | 5 |
|---|---|---|---|---|---|
| Copper Concentrate | A | B | C | D | E |
| Concentrate Analysis, % | | | | | |
| Cu | 27.8 | 23.4 | 24.6 | 13.8 | 8.67 |
| Fe | 28.8 | 29.0 | 28.0 | 31.6 | 33.2 |
| Pb | | 0.46 | 0.08 | 0.05 | 3.64 |
| Ni | 0.01 | 0.15 | 0.01 | 2.48 | 0.10 |
| Si | 2.41 | 1.09 | 4.42 | 5.23 | 1.47 |
| S | 32.5 | 34.1 | 30.8 | 26.5 | 31.4 |
| Zn | 0.02 | 5.90 | 0.07 | 0.07 | 9.79 |
| Calculated Mineralogy, % | | | | | |
| $CuFeS_2$ | 80.3 | 67.6 | 71.1 | 39.9 | 25.0 |
| $FeS_2$ | 7.2 | 9.7 | 8.4 | 0.0 | 9.0 |
| FeS | 1.6 | 6.2 | 3.9 | 30.7 | 32.3 |
| PbS | | 0.5 | 0.1 | 0.1 | 4.2 |
| NiS | | 0.2 | | 3.8 | 0.2 |
| ZnS | | 8.8 | 0.1 | 0.1 | 14.6 |
| Concentrate $D_{90}$, μm | 13 | 7 | 16 | 25 | 9 |
| Acid:Cu + Fe Mole Ratio | 0.67 | 0.69 | 0.69 | 0.78 | 0.84 |
| Temperature, °C | | | 150 | | |
| Oxygen Pressure, kPa | | | 750 | | |
| Coal Type | | | A | | |
| Coal Addition Rate, kg/t | 25 | 25 | 50 | 25 | 25 |
| Copper Extraction, % | | | | | |
| 30 min | 50.4 | 62.6 | 64.1 | 72,1 | 61.8 |
| 60 min | 64.7 | 83.4 | 77.9 | 87.1 | 89.5 |
| 120 min | 83.3 | 95.2 | 90.7 | 95.0 | 97.0 |
| 240 min | 96.7 | 98.2 | 96.5 | 98.3 | 97.9 |
| 360 min | 98.4 | | 98.1 | | |
| Final Extraction, % | | | | | |
| Cu | 98.4 | 98.2 | 98.1 | 98.3 | 97.9 |
| Fe | 26.8 | 38.3 | 29.1 | 22.6 | 6.5 |
| Ni | | | | 98.8 | |
| S | 16.3 | 15.4 | 18.7 | 16.5 | −11.5 |
| Zn | | 99.9 | | | 98.8 |
| Final Solution, g/L | | | | | |
| Cu | 79.0 | 76.2 | 77.7 | 27.4 | 17.4 |
| Fe | 19.1 | 27.1 | 15.9 | 16.1 | 5.3 |
| Ni | | | | 5.0 | |
| $H_2SO_4$ | 23.6 | 20.4 | 25.8 | 29.5 | 21.1 |
| Zn | | 11.6 | | 0.2 | 19.7 |

TABLE V-continued

| Test | 1* | 2** | 3 | 4 | 5 |
|---|---|---|---|---|---|
| Final S Conversion, % | | | | | |
| to S, elemental | 69.4 | 65.3 | 69.5 | 64.2 | 80.4 |
| to S, sulphate | 27.4 | 33.1 | 30.0 | 15.0 | 15.8 |
| unreacted | 3.2 | 1.6 | 0.5 | 20.8 | 3.8 |

*Table I, Test 3
**Table II, Test 3

It will be understood, of course, that modifications can be made in the embodiments of the invention illustrated and described herein without departing from the scope and purview of the invention as defined by the appended claims.

We claim:

1. A hydrometallurgical process for the extraction of copper from copper sulphide concentrates, which comprises:
   dispersing finely divided sulphidic copper concentrate in an aqueous sulphuric acid solution to form a slurry, and adjusting the concentration of sulphuric acid whereby it is effective to provide a predetermined copper, iron and acid concentration in a final leach solution;
   providing an effective amount of finely divided particulate coal compatible with the acid sulphate leach solution, which is operative under the reaction conditions of the following oxidizing reaction step, to inhibit the passivation of incompletely leached sulphide particles;
   reacting, with agitation, the slurry and coal with free oxygen bearing gas in a pressure vessel at a temperature above the melting point of sulphur which is effective to produce substantially complete extraction of copper values from said sulphides as soluble copper sulphate and concurrent conversion of a substantial portion of sulphide sulphur associated with said copper values to elemental form; and
   separating the product leach solution containing the dissolved copper values from the solid residue.

2. The process as set forth in claim 1 wherein the oxygen in the free oxygen bearing gas has an oxygen overpressure in the range of between about 100 to 3000 kPa.

3. The process as set forth in claim 1 wherein the oxygen in the free oxygen bearing gas has an oxygen overpressure in the range of between about 400 to 750 kPa.

4. The process as set forth in claim 2 wherein the finely divided particulate carbonaceous material is a coal selected from the group consisting of cannel coal, peat, lignite, sub-bituminous coal, bituminous coal, semi-bituminous coal, semi-anthracite coal and anthracite coal.

5. The process as set forth in claim 4 wherein the reaction temperature ranges between about 90° to 220° C.

6. The process as set forth in claim 4 wherein the reaction temperature ranges between about 120° to 180° C.

7. The process as set forth in claim 4 wherein the reaction temperature ranges between about 135° to 175° C.

8. The process as set forth in claim 4 wherein the coal is added in a quantity in the range of between 3 and 50 kg of coal per tonne of copper sulphide concentrate.

9. The process as set forth in claim 7 wherein the coal is added to the slurry in an amount of about 10 kg of coal per tonne of copper sulphide concentrate.

10. The process as set forth in claim 8 wherein the coal has a low ranking or intermediate ranking carbon level with a total carbon content in the range of about 40 to about 85%.

11. The process as set forth in claim 8 wherein the coal has an aliphatic carbon content below about 80% and above about 20%.

12. The process as set forth in claim 8 wherein the coal has an aliphatic carbon content in the range of between about 25% and 55%.

13. The process as set forth in claim 11 wherein the concentrate has a particle size of about 90% minus 44 microns or less.

14. The process as set forth in claim 11 wherein the concentrate has a particle size of about 90% minus 25 microns or less.

15. The process as set forth in claim 12 wherein the concentrate has a particle size of about 90% minus 10 microns.

16. A hydrometallurgical process for the extraction of copper from a chalcopyrite-containing sulphide feedstock, which comprises:
   dispersing finely divided feedstock in an aqueous sulphuric acid solution to form a slurry, and adjusting the concentration of said sulphuric acid whereby it is effective to provide a predetermined copper, iron and acid concentration in a final leach solution;
   providing an effective amount of finely divided particulate coal, compatible with the acid sulphate leach solution, which is operative under the reaction conditions of the following oxidizing reaction step, to inhibit the passivation of incompletely leached sulphide particles;
   reacting, with agitation, the slurry and coal with free oxygen bearing gas in a pressure vessel at a temperature above the melting point of sulfur which is effective to produce substantially complete extraction of copper values from said sulphides as soluble copper sulphate and concurrent conversion of a substantial portion of sulphide sulphur associated with said copper values to elemental form; and
   separating the product leach solution containing the dissolved copper values from the solid residue.

17. The process as set forth in claim 16 wherein the oxygen in the free oxygen bearing gas has an oxygen overpressure in the range of between about 100 to 3000 kPa.

18. The process as set forth in claim 16 wherein the oxygen in the free oxygen bearing gas has oxygen overpressure in the range of between about 400 to 750 kPa.

19. The process as set forth in claim 18 wherein the finely divided particulate carbonaceous material is a coal selected from the group consisting of cannel coal, peat, lignite, sub-bituminous coal, bituminous coal, semi-bituminous coal, semi-anthracite coal and anthracite coal.

20. The process as set forth in claim 19 wherein the reaction temperature ranges between about 90° to 220° C.

21. The process as set forth in claim 19 wherein the reaction temperature ranges between about 120° to 180° C.

22. The process as set forth in claim 19 wherein the reaction temperature ranges between about 135° to 175° C.

23. The process as set forth in claim 19 wherein the coal is added in a quantity in the range of between 3 and 50 kg of coal per tonne of copper sulphide concentrate.

24. The process as set forth in claim 22 wherein the coal is added to the slurry in an amount of about 10 kg of coal per tonne of copper sulphide concentrate.

25. The process as set forth in claim 23 wherein the coal has a low ranking or intermediate ranking carbon level with a total carbon content in the range of about 40 to about 85%.

26. The process as set forth in claim 23 wherein the coal has an aliphatic carbon content below about 80% and above about 20%.

27. The process as set forth in claim 23 wherein the coal has an aliphatic carbon content in the range of between about 25% and 55%.

28. The process as set forth in claim 26 wherein the concentrate has a particle size of about 90% minus 44 microns or less.

29. The process as set forth in claim 26 wherein the concentrate has a particle size of about 90% minus 25 microns or less.

30. The process as set forth in claim 27 wherein the concentrate has a particle size of about 90% minus 10 microns.

31. A hydrometallurgical process for the extraction of copper from a chalcopyrite-containing sulphide feedstock, which comprises:

dispersing finely divided feedstock in an aqueous solution, an aqueous solution of ferrous sulphate, an aqueous solution of ferric sulphate or an aqueous solution of an admixture thereof to form a slurry and to thereby generate sulphuric acid in-situ in the following oxidizing reaction step, and adjusting the concentration of said sulphuric acid whereby it is effective to provide a predetermined copper, iron and acid concentration in a final leach solution;

providing an effective amount of finely divided particulate coal, compatible with the acid sulphate leach solution, which is operative under the reaction conditions of the following oxidizing reaction step, to inhibit the passivation of incompletely leached sulphide particles;

reacting, with agitation, the slurry and coal with free oxygen bearing gas in a pressure vessel at a temperature above the melting point of sulfur which is effective to produce substantially complete extraction of copper values from said sulphides as soluble copper sulphate and concurrent conversion of a substantial portion of sulphide sulphur associated with said copper values to elemental form; and separating the product leach solution containing the dissolved copper values from the solid residue.

32. The process as set forth in claim 31 wherein the oxygen in the free oxygen bearing gas has an oxygen overpressure in the range of between about 100 to 3000 kPa.

33. The process as set forth in claim 31 wherein the oxygen in the free oxygen bearing gas has an oxygen overpressure in the range of between about 400 to 750 kPa.

34. The process as set forth in claim 31 wherein the finely divided particulate carbonaceous material is a coal selected from the group consisting of cannel coal, peat, lignite, sub-bituminous coal, bituminous coal, semi-bituminous coal, semi-anthracite coal and anthracite coal.

35. The process as set forth in claim 34 wherein the reaction temperature ranges between about 90° to 220° C.

36. The process as set forth in claim 34 wherein the reaction temperature ranges between about 120° to 180° C.

37. The process as set forth in claim 34 wherein the reaction temperature ranges between about 135° to 175° C.

38. The process as set forth in claim 34 wherein the coal is added in a quantity in the range of between 3 and 50 kg of coal per tonne of copper sulphide concentrate.

39. The process as set forth in claim 34 wherein the coal is added to the slurry in an amount of about 10 kg of coal per tonne of copper sulphide concentrate.

40. The process as set forth in claim 38 wherein the coal has a low ranking or intermediate ranking carbon level with a total carbon content in the range of about 40 to about 85%.

41. The process as set forth in claim 38 wherein the coal has an aliphatic carbon content below about 80% and above about 20%.

42. The process as set forth in claim 38 wherein the coal has an aliphatic carbon content in the range of between about 25% and 55%.

43. The process as set forth in claim 41 wherein the concentrate has a particle size of about 90% minus 44 microns or less.

44. The process as set forth in claim 41 wherein the concentrate has a particle size of about 90% minus 25 microns or less.

45. The process as set forth in claim 42 wherein the concentrate has a particle size of about 90% minus 10 microns.

* * * * *